United States Patent [19]
Andress

[11] Patent Number: 5,823,174
[45] Date of Patent: Oct. 20, 1998

[54] PORTABLE COOKING DEVICE WITH VERTICALLY ARRANGED HEARTH

[76] Inventor: Alfonso G. Andress, Malecon Balta 720, Lima 18, Peru

[21] Appl. No.: 915,710

[22] Filed: Aug. 21, 1997

[51] Int. Cl.[6] .................................................. F24B 3/00
[52] U.S. Cl. ........................................ 126/25 R; 126/9 R
[58] Field of Search ............................ 126/25 R, 25 AA, 126/9 R

[56] References Cited

U.S. PATENT DOCUMENTS

| | | | |
|---|---|---|---|
| 2,379,239 | 6/1945 | Krebs | 126/25 |
| 2,734,499 | 2/1956 | Lombardi | 126/25 |
| 2,855,918 | 10/1958 | Tescula | 126/25 |
| 3,085,562 | 4/1963 | Persinger et al. | 126/25 |
| 3,140,651 | 7/1964 | Barnett | 99/339 |
| 3,175,549 | 3/1965 | Bergsten | 126/25 |
| 3,182,585 | 5/1965 | Resnch et al. | 99/340 |
| 3,230,948 | 1/1966 | Schmitt | 126/25 |
| 3,343,527 | 9/1967 | Manteris | 126/25 |
| 3,550,525 | 12/1970 | Rabello | 99/421 |
| 3,572,313 | 3/1971 | Ciancaglini | 126/9 |
| 3,581,654 | 6/1971 | Tescula | 99/399 |
| 3,604,408 | 9/1971 | Tescula | 126/25 |
| 3,611,912 | 10/1971 | Choc | 99/339 |
| 3,742,838 | 7/1973 | Luschen et al. | 99/389 |
| 3,783,855 | 1/1974 | Newinger | 126/25 |
| 3,832,989 | 9/1974 | Belford | 126/25 |
| 3,999,472 | 12/1976 | Einto | 99/340 |
| 4,120,237 | 10/1978 | Mecherlen | 99/340 |
| 4,338,912 | 7/1982 | Gaskins | 126/25 |
| 4,442,824 | 4/1984 | Amici | 126/14 |
| 4,730,597 | 3/1988 | Hottenroth et al. | 126/2 |
| 5,333,540 | 8/1994 | Mazzocchi | 99/421 |
| 5,431,093 | 7/1995 | Dodgen | 99/427 |
| 5,499,574 | 3/1996 | Esposito | 99/339 |
| 5,536,518 | 7/1996 | Rummel | 426/523 |

*Primary Examiner*—Carroll B. Dority
*Attorney, Agent, or Firm*—Kile McIntyre & Harbin

[57] ABSTRACT

A portable cooking device includes a body defining a heating chamber and having an open top. A main food supporting grill is mounted on the body in a generally horizontal manner so as to span at least a portion of the open top. Walls extend generally upwardly from portions of the body. The walls include opposing side walls and a rear wall extending between the side walls. A grate is mounted between the side walls and is in spaced relation to the rear wall so as to define a generally vertically arranged fire chamber for holding a source of heat generating fuel. A secondary food supporting grill is mounted between the side walls, forwardly of the grate and above and generally parallel to the main grill. Whereby, when fuel is generating heat in the fire chamber, heat is reflected from the rear wall structure and (1) convects from the fire chamber to the heating chamber and generally upwardly through the main grill and secondary grill and (2) radiates generally outwardly from the fire chamber to the main grill and secondary grill.

20 Claims, 2 Drawing Sheets

PORTABLE COOKING DEVICE WITH VERTICALLY ARRANGED HEARTH

BACKGROUND OF THE INVENTION

This invention relates to portable cooking devices and, more particularly, to an outdoor barbecue device having a vertically arranged fire chamber or hearth for both roasting and grilling food.

Conventional barbecue-type grilling devices typically include a horizontally disposed grill which is placed directly above the burning coals, or the source of heat used for cooking. As the food cooks, grease and fat drippings from the meat may burst into flames upon contact with the heat source, giving off fumes which may burn or impair the taste of the food. Oftentimes, the liquid dripping from the meat may cause a flame to singe or burn the meat which deposits carbon on the meat. Consumption of such charred meat is known to contribute to the development of cancer in humans over time.

In addition, with a conventional grill, it is generally viable only to grill one type of food at a time. Although some grills may have a rotisserie mounted above the main grill, it is difficult to roast food on the rotisserie while at the same time grilling food on the main grill, since food on the main grill may block rising heat required for roasting at the rotisserie. Further, it is virtually unthinkable to cook different types of food, such as pizza, on conventional grills.

SUMMARY OF THE INVENTION

An object of the invention is to provide a cooking device having a vertically arranged fire chamber or hearth such that when roasting and/or grilling food, drippings from the food will not fuel a fire that burns food. It is a further object of the invention to provide a grill that permits cooking a variety of foods at the same time.

In accordance with the principles of the present invention, these objectives are obtained by providing a portable cooking device including a body having walls defining a heating chamber and having an open top. A main support grill is mounted on the body in a generally horizontal manner so as to span at least a portion of the open top. Walls extend generally upwardly from portions of the body. The walls include opposing side walls and a rear wall structure extending between the side walls. A grate is mounted between the side walls and is in spaced relation to the rear wall structure so as to define a generally vertically arranged fire chamber for holding burning fuel. A secondary support grill is mounted between the side walls, forwardly of the grate, and above and generally parallel to the main grill. Whereby, when fuel is generating heat in the fire chamber, heat is reflected from the rear wall structure and (1) convects from the fire chamber to the heating chamber and generally upwardly through the main grill and secondary grill and (2) radiates generally outwardly from the fire chamber to the main grill and secondary grill.

Another object of the present invention is the provision of a cooking device of the type described which is simple in construction, effective in operation, and economical to manufacture and maintain.

These and other objects of the present invention will become apparent during the course of the following detailed description and appended claims.

The invention may best be understood with reference to the accompanying drawings wherein an illustrative embodiment is shown.

DETAILED DESCRIPTION OF THE PRESENTLY PREFERRED EXEMPLARY EMBODIMENT

Figure 1:
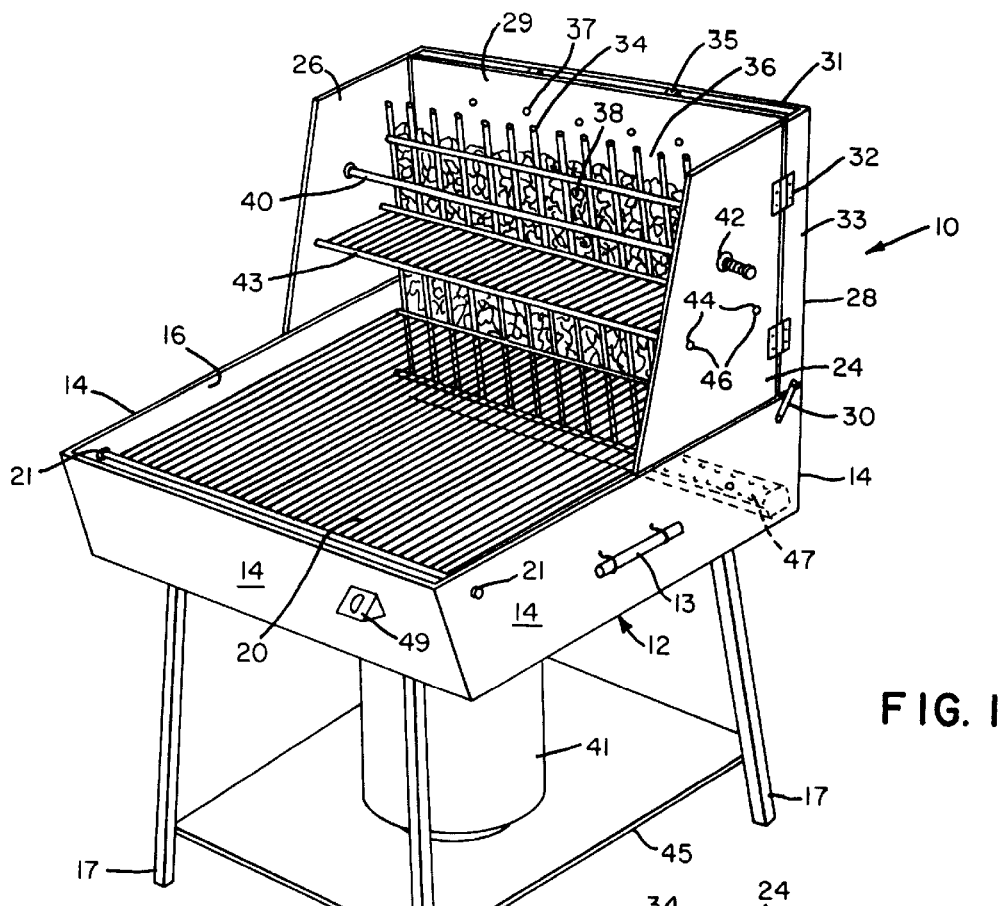
FIG. 1 is a perspective view of a portable grilling device provided in accordance with the principles of the present invention.

Referring to FIG. 1, a portable cooking device, generally indicated at 10, is shown which embodies the principles of the present invention. The device 10 includes a rectangularly-shaped body 12 having four walls 14, defining a heating chamber 18, and an open top 16. The body 12 is elevated from the ground by four removable legs, with one leg 17 being mounted generally at each corner of the body 12. The legs 17 are screwed into projections 19 extending from the body and are sized to fit within the interior of the body 12, once removed, to ease transport and/or storage of the device 10. Handles 13 are provided on opposing walls 14. A main food supporting grill 20 is pivotally coupled to the body 12 at connections 21 so as to rotate generally upwardly to an inoperative position as shown by the dashed lines in FIG. 2, the function of which will be explained below. In an operative position, as shown in FIG. 1, the main grill 20 is supported by interior extending flanges or the like (not shown) on walls 14 so as to span a substantial portion of the open top of the body 12. In the operative position, the main grill 20 is disposed in a generally horizontal manner providing a cooking surface for grilling food. A removable receptacle 22 is disposed below the main grill 20 for collecting drippings from food being cooked.

Walls extend generally upwardly from a rear portion of the body 12. The walls include two opposing side walls 24 and 26 and rear wall structure 28 extending between the side walls 24 and 26. The rear wall structure 28 is preferably formed by a front plate 29 and a back plate 31 coupled together via opposing side panels 33 and posts 35 so as to be in spaced relation to insulate the back plate from the front plate. A plurality of holes 37 are provided in plate 29. The rear wall structure 28 is pivotally coupled to the body 12 at opposing ends via connections 30 so as to fold forwardly, as will be explained below. Further, each side wall 24 and 26 is coupled via hinges 32 to the rear wall structure 28 so as to move 180 degrees.

A grate 34 is mounted between the side walls 24 and 26 and is in spaced relation to the rear wall structure 28 so as to define a hearth or fire chamber 36 for holding a source of heat generating fuel. In the illustrated embodiment, the grate 34 extends generally vertically, with a lower portion of the fire chamber 36 communicating with the heating chamber 18. Charcoal, lava rocks (for gas grills), wood or other fuel sources is contained in the fire chamber 36 between the grate 34 and the rear wall structure 28 with some of the charcoal, lava rocks or wood being disposed below the level of the main grill 20 to ensure heat from the fire chamber 36 convects to the heating chamber 18 and generally upwardly through the main grill 20. It can be appreciated, however, that a substantial portion (generally more than one-quarter) of the fire chamber 36 is above the main grill 20. This ensures that in operation, heat may convect to the heating chamber 18 and may also radiate generally outwardly from the fire chamber 36.

In the illustrated embodiment, the cooking device 10 is fueled by propane gas. Thus, lava rocks 38 are provided in the fire chamber 36 and a propane tank 41 is supported on mounting plate 45 coupled to legs 17. Propane gas is released at manifold 47 mounted directly below the fire chamber 36. An ingnitor 49 is provided in the conventional manner to ignite the propane gas.

An elongated rod 40 is mounted between the side walls 24 and 26 forwardly of and generally adjacent to the grate 34. The rod 40 is mounted through openings 42 in the side walls 24 and 26 so as to rotate through 360 degrees either by manual or motorized operation. Thus, the rod 40 provides a rotisserie for roasting meats such as chicken or the like.

A secondary food supporting grill 43 is mounted between the side walls 24 and 26 forwardly of the grate 34, above the main grill 20 and generally parallel to the main grill 20. Thus, ends 44 of the secondary grill 43 extend through holes 46 in the side walls 24 and 26. The secondary grill 43 may support skewers or smaller meats such as sausages.

Figure 2:
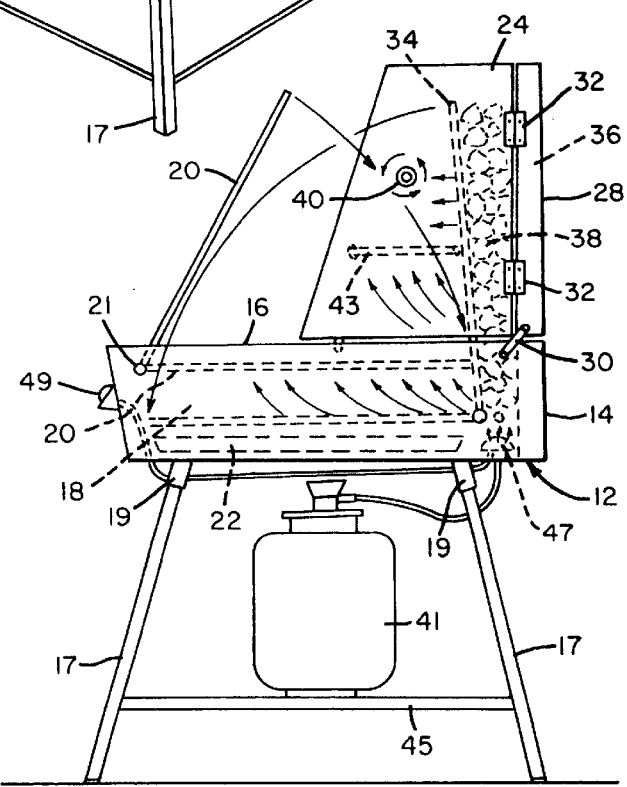
FIG. 2 is a side view of the portable grilling device of FIG. 1, shown with the first horizontal grill rotated upwardly to an inoperative position.

With reference to FIG. 2 and as noted above, the main grill 20 is mounted with respect to the body 12 so as to pivot from an operative position (dashed lines in FIG. 20), upwardly and away from the open top of the body 12, to an inoperative position (solid lines in FIG. 20), providing access to the heating chamber 18 and thus to the receptacle 22. In addition, the grate 34 is mounted with respect to the body 12 so as to pivot downwardly through the open top of the body 12 when the main grill 20 is pivoted to the inoperative position and the rod 40 and the secondary grill 42 are removed from the side walls 24 and 26. This permits the grate 34 to be disposed in the heating chamber 18 generally adjacent and parallel to the main grill 20 for storage, after the main grill 20 is returned to the operative position thereof.

In addition, the side walls 24 and 26 are hinged with respect to the rear wall structure 28 such that when the secondary grill 42 and the rod 40 are removed from the side walls 24 and 26, the side walls may be pivoted toward each other to be disposed in folded relation, generally adjacent to the rear wall structure 28. The rear wall structure 28 may then be pivoted forwardly about connections 30 so that the side walls rest on a portion of the main grill 20 and cover at least a portion of the open top of the body 12, thereby closing the device 10 for storage and/or transporting.

When the device 10 is in use, heat is transferred in the manner indicated by the arrows in FIG. 2. Thus, heat reflects from the rear wall structure and is convected outwardly, with both generally horizontal and vertical components, from the fire chamber 36 to the heating chamber 18 and generally upwardly through the main grill 20, and generally upwardly to the secondary grill 43 and to the rotisserie rod 40. Heat also radiates generally outwardly to the main and secondary grills and to the rod 40.

It can be seen that the device 10 provides a portable cooking apparatus which is capable of cooking food in three different areas: on the main grill, on the secondary grill and on the rotating rod, all at the same time. Since the main grill 20 is not directly above the hearth as in conventional grills, burning or charring of meat cooking on the main grill can be prevented, thereby enabling one to cook in a more healthy manner. Further, since heat is convected upwardly from the heating chamber 18 and heat also radiates outwardly from the fire chamber 36, it is possible to cook pizza or the like on the main grill 20. Control of cooking is possible by moving the pizza or item toward or away from the fire chamber.

Using eleven pounds of charcoal as the fuel in the hearth, the following was recorded:

| Time | Temperature |
| --- | --- |
| 12:45 p.m. | start |
| 12:55 p.m. | 120° F. |
| 1:05 p.m. | 280° F. |
| 1:10 p.m. | 330° F. |
| 1:30 p.m. | 450° F. |
| 1:45 p.m. | 500° F. |

Two chickens of 1.4 kgs each were roasted on the rotisserie and took 50 minutes to be cooked. The inside temperature of the cooked chickens was 60° C. Meat and sausages were cooked at 400° F. in 15 minutes, with the inside temperature being 55° C. Pizza was cooked at 400° F. in 5 minutes.

Figure 3:
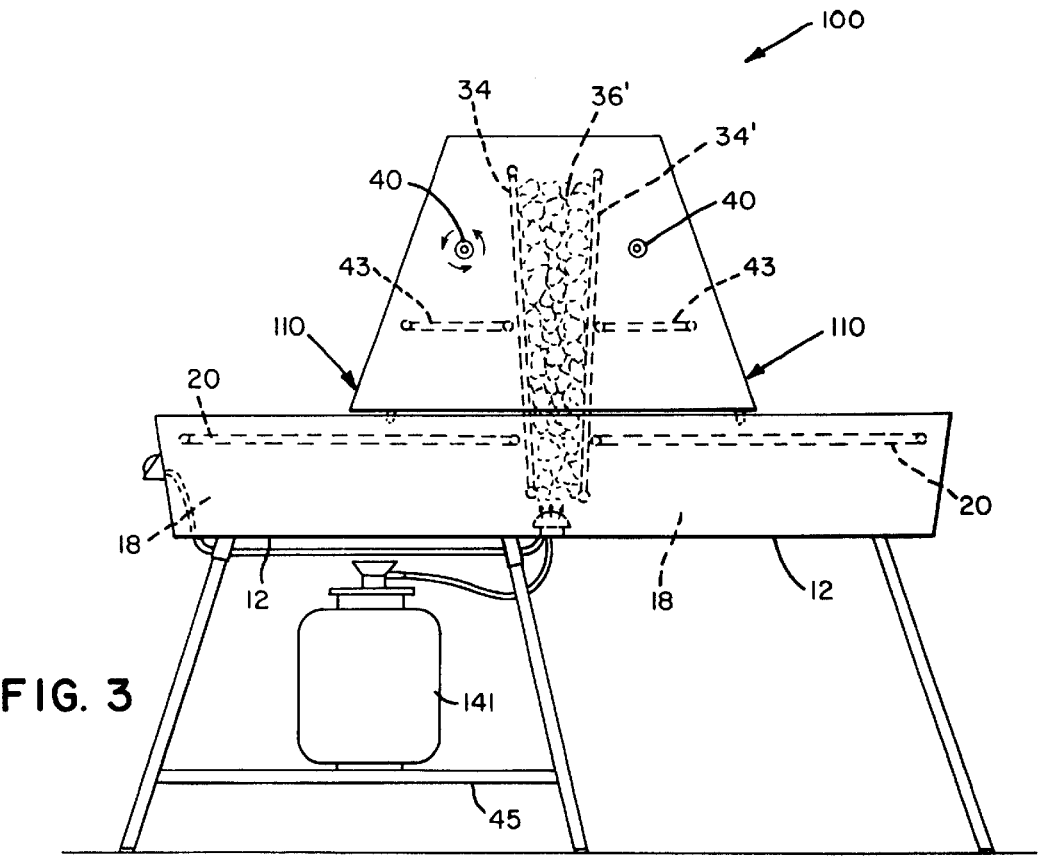
FIG. 3 is a side view of a second embodiment of the invention which is double the size of the grilling device of the embodiment of FIG. 1.

In accordance with the invention and as shown in FIG. 3, when more grilling space is required, the grilling device 100 may include generally mirror image grills 110 and 112. As shown, the grills 110 and 112 are gas operated and the device 100 includes one tank 141 which supplies fuel to a common fire chamber 36' which is defined by a pair of grates 34 and 34'. It can be appreciated that charcoal, wood or other fuel may be used as the heat generating source for the grills instead of gas. The grills 110 and 112 are configured generally identically as the grilling device 10, described above, thus like parts are given like numerals. However, no rear wall structure is required.

As an alternative to providing a second grill, it can be appreciated that the grilling device 10 may be made larger by increasing the size of the body and adapting the size of the rear wall structure and other components appropriately.

Figure 4:
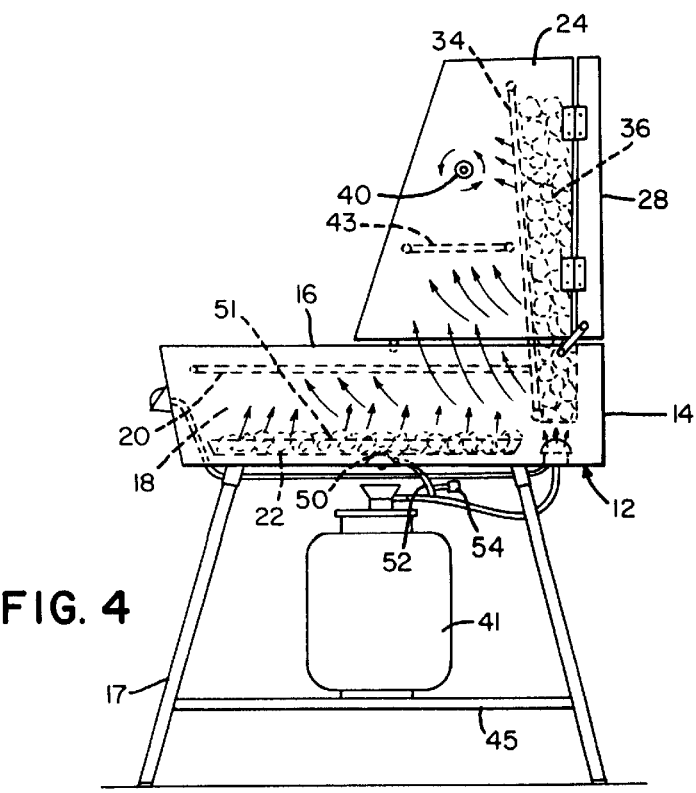
FIG. 4 is a side view of the grilling device of FIG. 1 modified to permit cooking from the vertically arranged hearth and/or from underneath the main grill.

There are certain items such as soups cooked in kettles that are best cooked by direct heat from below. Thus, in accordance with the invention and as shown in FIG. 4, tray 22 or a rack beneath the main grill 20 may be supplied with lava rocks, charcoal, wood or other heat generating material. In the illustrated embodiment, lava rocks are provided in tray 22. Further, a manifold 50 is coupled via a gas line 52 to the propane tank 41 to provide gas to the lava rocks. A valve 54 is provided in the gas line 52 which permits gas to be supplied to or be shut-off from the manifold 50. Thus, heat may be supplied jointly or individually from the vertical fire chamber and/or from below via the lava rocks in the tray 22.

While the invention has been described in connection with what is presently considered to be the most practical and preferred embodiment, it is understood that the invention is not limited to the disclosed embodiment, but, on the contrary, is intended to cover various modifications and equivalent arrangements included within the spirit and scope of the appended claims.

What is claimed is:

1. A cooking device comprising:
   a body having walls defining a heating chamber and having an open top,
   a main food supporting grill mounted on said body in a generally horizontal manner so as to span at least a portion of said open top, walls extending generally upwardly from portions of said body, said walls including opposing side walls and a rear wall structure extending between said side walls, a grate located between said side walls and in spaced relation to said rear wall structure so as to define a generally vertically arranged fire chamber for holding a source of heat generating fuel, a secondary food supporting grill located between said side walls, forwardly of said grate, and above and generally parallel to said main grill, whereby, when fuel is generating heat in said fire chamber, heat is reflected from said rear wall structure and (1) convects from said fire chamber to said heating chamber and generally upwardly through said main grill and secondary grill and (2) radiates generally outwardly from said fire chamber to said main grill and secondary grill.

2. The cooking device according to claim 1, further comprising an elongated rod mounted with respect to at least one of said side walls for rotational movement with respect thereto, said rod being disposed forwardly of and generally adjacent to said grate, and above said main grill.

3. The cooking device according to claim 2, wherein said rod is supported by each of said side walls.

4. The cooking device according to claim 3, wherein said main grill is mounted with respect to said body so as to pivot from an operative position upwardly, away from said open top of said body providing access to said heating chamber, and said grate is mounted with respect to said body so as to pivot downwardly through said open top of said body when said main grill is pivoted upwardly and said rod and said secondary grill are removed from said side walls, such that said grate may be disposed in said heating chamber generally adjacent and parallel to said main grill for storage, once said main grill is returned to the operative position thereof.

5. The cooking device according to claim 4, wherein said side walls are hinged with respect to said rear wall structure such that when said secondary grill and said rod are removed from said side walls, said side walls may be pivoted toward each other and be disposed in folded relation, generally adjacent said rear wall structure.

6. The cooking device according to claim 5, wherein said rear wall structure is pivotally mounted with respect to said body such that when said side walls are in folded relation, said rear wall structure may be pivoted downwardly so that said side walls rest on main grill.

7. The cooking device according to claim 1, further comprising a receptacle disposed below said main grill for collecting drippings from food being cooked.

8. The cooking device according to claim 1, wherein a tray is disposed below said main grill, said tray including a source of heat generating fuel.

9. The cooking device according to claim 1, further comprising support legs mounted to an underside of said body for elevating and the device above the ground.

10. The cooking device according to claim 1, wherein said rear wall structure comprises a front plate and an opposing back plate, said plates being joined by opposing side panels such that said front and back plates are in spaced relation.

11. The cooking device according to claim 1, wherein said source of heat generating fuel includes one of charcoal, wood and lava rocks disposed in said fire chamber.

12. The cooking device according to claim 1, wherein said fire chamber extends adjacent to and substantially above said main grill.

13. A cooking device comprising:

a body having walls enclosing a heating chamber and having an open top, a main food supporting grill mounted on said body in a generally horizontal manner so as to span at least a portion of said open top, walls extending generally upwardly from portions of said body, said walls including opposing side walls and a rear wall structure extending between said side walls, an elongated rod mounted with respect to at least one of said side walls for rotational movement with respect thereto, said rod being disposed forwardly of and generally adjacent to said grate, and above said main grill, said rod being constructed and arranged to hold food for roasting, and a grate mounted between said side walls and in spaced relation to said rear wall structure so as to define a generally vertically arranged fire chamber for holding a source of heat generating fuel, said fire chamber being generally adjacent to and in communication with said heating chamber such that when fuel is generating heat in said fire chamber, heat reflects from said rear wall structure and (1) convects, with horizontal and vertical components, from said fire chamber to said heating chamber and generally upwardly through said main food supporting grill and (2) radiates generally outwardly from said fire chamber to said main grill.

14. The cooking device according to claim 13, further comprising a secondary food supporting grill mounted between said side walls, forwardly of said grate and in spaced relation above said main grill.

15. The cooking device according to claim 13, wherein said main grill is mounted with respect to said body so as to pivot from an operative position upwardly, away from said open top of said body providing access to said heating chamber, and said grate is mounted with respect to said body so as to pivot downwardly through said open top of said body when said main grill is pivoted upwardly and said rod and said secondary grill are removed from said side walls, such that said grate may be disposed in said heating chamber generally adjacent and parallel to said main grill for storage, once said main grill is returned to the operative position thereof.

16. The cooking device according to claim 15, wherein said side walls are hinged with respect to said rear wall structure such that when said secondary grill and said rod are removed from said side walls, said side walls may be pivoted toward each other and be disposed in folded relation, generally adjacent said rear wall structure.

17. The cooking device according to claim 16, wherein said rear wall structure is pivotally mounted with respect to said body such that when said side walls are in folded relation, said rear wall structure may be pivoted downwardly so that said side walls rest on main grill.

18. The cooking device according to claim 13, wherein said source of heat generating fuel includes one of charcoal, wood and lava rocks disposed in said fire chamber.

19. The cooking device according to claim 13, wherein said fire chamber extends adjacent to and substantially above said main grill.

20. A cooking device comprising:

a body having walls enclosing a heating chamber and having an open top, first and second main food supporting grill portions mounted on said body in a generally horizontal manner so as to span at least a portion of said open top, walls extending generally upwardly from portions of said body, said walls including opposing side walls, and a pair of spaced grates located between said side walls and said first and second grill portions so as to define a generally vertically arranged fire chamber for holding a source of heat generating fuel, said fire chamber being generally adjacent to and in communication with said heating chamber such that when fuel is generating heat in said fire chamber, heat (1) convects, with horizontal and vertical components, from said fire chamber to said heating chamber and generally upwardly through said first and second main food supporting grill portions and (2) radiates generally outwardly from said fire chamber to said first and second main food supporting grill portions.

* * * * *